July 13, 1943.    C. G. FERRARI ET AL    2,324,203
MULTIPLE FLOUR BLEACHING PROCESS
Filed Aug. 16, 1940
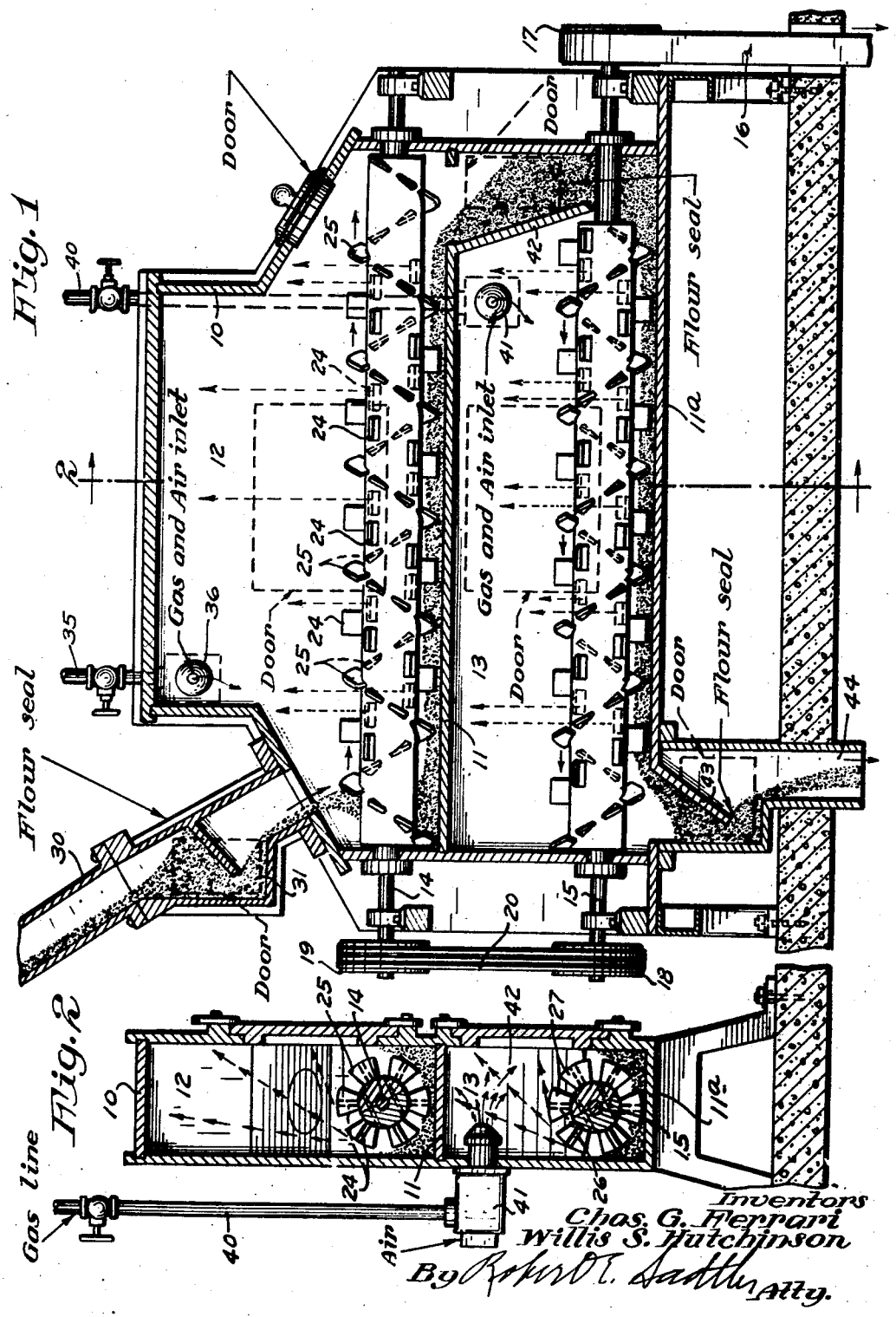

Patented July 13, 1943

2,324,203

UNITED STATES PATENT OFFICE 2,324,203

MULTIPLE FLOUR BLEACHING PROCESS

Charles G. Ferrari, Minneapolis, and Willis S. Hutchinson, St. Paul, Minn., assignors to General Mills, Inc., a corporation of Delaware Application August 16, 1940, Serial No. 352,910

4 Claims. (Cl. 99—232)

The present invention relates to the improvement of wheat flour and other edible finely divided milled products, including the color, baking, and keeping qualities thereof and more particularly has reference to processes for the bleaching and ageing or maturing of flour and the like.

The principal object of our invention is to provide a process for the production of a bleached flour of excellent color without either adversely affecting its baking properties or its keeping qualities.

Another object of our invention is to provide a bleaching process for flour and the like in which smaller quantities of bleaching agents are required for the bleaching and maturing operation than would be required according to the usual commercial bleaching methods.

A further object of our invention is to provide a bleaching process for flour and the like which will enable baked goods of greater volume to be produced from the flour bleached by our process than would be produced from flour bleached by conventional bleaching methods.

A still further object of our invention is to provide a process for the multiple bleaching and maturing of wheat flour and other edible finely divided milled products which comprises exposing flour or other finely divided products while agitated in a finely divided state to the action of a gaseous bleaching agent for a sufficient length of time and at a sufficient partial pressure of the gas to at least partially bleach the flour or other finely divided product and then exposing the flour or other finely divided product while agitated in a finely divided state to the action of a second gaseous bleaching agent of a similar or different nature than that used in the first bleaching operation, for a sufficient length of time and at a sufficient partial pressure of the gas to completely bleach and mature the flour or other edible finely divided product.

These and other objects, as will hereinafter appear, are accomplished by this invention which may be practiced in apparatus shown in the accompanying drawing in which Figure 1 is a vertical section through a double compartment agitator with suitable seals for the gas; and Fig. 2 is a transverse section on the line 2—2 of Fig. 1.

The foregoing figures illustrate a type of apparatus for carrying out the present invention. It consists essentially of an agitator having a housing 10 with a central horizontal partition 11 dividing the agitator into upper and lower compartments 12 and 13, respectively. Upper and lower shafts 14 and 15 are journalled in suitable bearings carried by the partition housing, the lower shaft 15 being driven by means of a belt 16 and a pulley 17. This shaft in turn has a pulley 18 which drives a pulley 19 on the shaft 14 by means of a belt 20.

The shaft 14 carries a series of paddles 24 which serve to beat the flour and to help keep it in suspension in the air of the upper compartment. This shaft also carries a series of propeller blades 25 which cause the flour on the partition 11 to be moved from left to right as will presently be more fully explained.

Similarly, the shaft 15 is provided with paddles 26 and with propeller blades 27, the latter, however, being set reversely to the blades 25 so as to propel the flour resting on the bottom 11a from right to left.

Flour is fed to the agitator by means of a chute 30 which is provided with a flour seal 31 to prevent gas within the compartment 12 from passing up through this chute. Thus flour is delivered to the agitator at the left-hand end of the shaft 14 and is propelled to the right.

The diluted gas for bleaching in the compartment 12 is supplied thereto through a pipe 35 and may be mixed with several times its volume of air in a mixing valve 36 which may be of any suitable type for this purpose. Gas is fed to the compartment 13 through a pipe 40 and may be mixed with a suitable amount of air by means of a mixing valve 41.

The compartments 12 and 13 are separated by means of a suitable flour seal 42 which maintains at all times a suitable depth of flour at this point so that gas from one compartment will not readily pass to the other. Likewise, a flour seal 43 is provided at the outlet end of the compartment 13 to prevent gas therein from passing to the delivery chute 44 by means of which the bleached flour leaves the agitator.

It will be seen from the foregoing that flour to be bleached passes down through the chute 30 into compartment 12 where it is violently agitated and mixed with the first bleaching gas and is propelled toward the outlet end at the right by means of the propeller blades 25. As the flour which has thus passed its first bleaching operation passes the flour seal 42 it is picked up by the propeller blades 27 on the shaft 15 and moved to the left. At the same time, the paddles 26 cause it to be violently agitated so as to bring it intimately into contact with the second bleaching gas in the compartment 13. As it passes from right to left, it then receives its second bleaching operation and is delivered to the flour seal 43 where it passes down the delivery chute 44 having passed its second bleaching operation. If additional bleaching operations are desired, one or more additional bleaching chambers may be added in vertical alignment with flour seals between adjacent chambers in the manner disclosed.

According to present commercial bleaching processes, flours are bleached and aged in separate stages of treatment. For example, the initial treatment is accomplished with gaseous nitrogen trichloride which matures the flour. Nitrogen trichloride, in addition to being a maturing agent, also possesses bleaching properties, but when used in sufficient amount to obtain a complete commercial color removal, injuries the quality of the flour. Therefore, for this reason, nitrogen trichloride is used in an amount not substantially in excess of that required to mature or age the flour, and the necessary additional bleaching is accomplished by a subsequent treatment with benzoyl peroxide, which has no maturing properties. The process outlined above is time-consuming since benzoyl peroxide is a solid which requires approximately 10 to 20 hours to completely react with the flour and benzoyl peroxide is rather expensive.

Our invention is based upon the discovery that the above-mentioned difficulties may be obviated by bleaching and maturing flour by a process which comprises exposing the flour or other edible finely divided milled products, while agitated in a finely divided state, to the action of a gaseous bleaching agent for a sufficient length of time and at a sufficient partial pressure of the gas to at least partially bleach the flour or other finely divided product and then exposing the flour or other finely divided product, while agitated in a finely divided state, to the action of a second gaseous bleaching agent of a similar or different nature than that used in the first bleaching operation, for a sufficient length of time and at a sufficient partial pressure of the gas to complete the bleaching and maturing of the flour or other edible finely divided product. As an alternative to the process set forth above, we may mix or blend a stream of flour which has been so treated with another stream of flour which has also been similarly treated with other gaseous reagents thereby producing a flour having the desired color, keeping qualities, and baking properties.

The term "multiple" bleaching as used in the specification and claims refers to a method of applying gaseous bleaching agents. In multiple bleaching, flour is treated with multiple doses of bleaching reagent. Two variations occur when the repeated doses consist on the one hand of the same bleaching reagent and on the other hand of different reagents. We have found that both variations give improved results.

The use of so-called bleaching agents on flour has two basic objectives:

(1) To improve the color of the flour; and
(2) To improve the baking properties of the flour.

The best result would be a combination of the two.

In making the above statement, it is understood that the problem of bleaching varies from one flour to another and that in many cases the desired objective would be to improve the color of the flour without injuring its baking properties. These objectives have been sought for a number of years in all branches of the milling industry. Various bleaching reagents have been brought out from time to time and have been adopted or discarded depending upon their merits and the cost thereof. The general objective of the present invention was to obtain the above improvements in greater degree and at lower costs.

The present bleaching procedures generally used in industry are based almost entirely upon trial and error experiment. This is partly caused by the fact that the mechanism of bleaching and treating flour by so-called bleaching agents is not fully understood. It is further caused by the fact that experiments necessary for any thorough investigation are comparatively expensive. Any such study is complicated by the differences that exist between various types of wheat during the same season and between the same types of wheat from different crops.

In commercial use today there are three types of bleaching reagents: gaseous, liquid and solid. The solid reagents are represented mainly by benzoyl peroxide. The most important gaseous reagents at present are nitrogen peroxide, $NO_2$, $N_2O_4$ nitrogen trichloride, $NCl_3$ and chlorine. Various other reagents which have been used occasionally or have been suggested are, for example, as follows: nitrosyl chloride and hydrogen peroxide as well as various liquid fatty acid peroxides. Gaseous reagents react practically instantaneously with the flour, whereas the solid reagents act slowly and may require as much as 10 to 20 hours to cause substantially all the color removal of which they are capable after complete blending has taken place. The present invention is concerned solely with the fast-acting reagents, that is, with the gaseous classification.

As heretofore stated, partial or total elimination of benzoyl peroxide is a desired objective because the cost of that material is very high, that is, at present about one dollar per pound for a commercial product containing about 16% of the active agent, benzoyl peroxide, or from one cent to three cents per barrel of finished flour, when used in combination with gaseous reagents.

According to the prior art, the desired amount of reagents was determined on a small scale. This quantity was then added to the flour in a suitable single compartment agitator. The gas usually consisted of a single component, for instance, chlorine.

According to the present process, the gases used in bleaching are applied only in comparatively small quantities and have been diluted with air to low partial pressures, say in the order of 0.5 to 35 mm. of mercury.

For convenience in reference, the bleaching agents herein mentioned are listed showing both the chemical name and formula. All but #6 are gaseous.

*Reagents considered*

| | Chemical name | Formula | How produced |
|---|---|---|---|
| 1 | Nitrogen peroxide | $NO_2$, $N_2O_4$ | Generated by passage of air over electric arc. |
| 2 | Chlorine dioxide | $ClO_2$ | May be produced according to the process set forth in U. S. Pat. No. 2,172,434, dated Sept. 12, 1939, to George L. Cunningham. |
| 3 | Nitrogen trichloride | $NCl_3$ | Reaction of chlorine with a soluble ammonium salt. |
| 4 | Chlorine | $Cl_2$ | Electrolysis of salt solution. |
| 5 | Hypochlorous acid | $HOCl$ | Treating chlorine water with limestone. |
| 6 | Benzoyl peroxide | $(C_6H_5CO)_2O_2$ | Reaction between benzoyl chloride and a suitable peroxide. |

Reagents numbered 1, 3, 4 and 6 are now in widespread commercial use.

The ultimate results of bleaching processes must be interpreted in the light of both the color of the flour and the quality of the finished product. Both factors are important although the latter may be considered the ultimate test. Nevertheless, color removal may be taken as a definite index of the bleaching efficiency of the new processes for bleaching which are described herein. This is true because a numerical value can be given to the flour color by measuring the carotenoid pigment content by suitable means. Flour color is conveniently expressed as parts of carotene per million parts of flour. Therefore, a high carotene value means a large amount of yellow color in the flour, while a low carotene value means a greater part of the color has been removed. Flour bleached according to our process has a very superior white color which indicates a carotene content of approximately 0.4 to 1.1 parts per million parts of flour, depending on the initial carotene content of the flour. This carotene content is determined by the naphtha-alcohol procedure.

*Multiple treatment of flour with the same bleaching gas*

Applicants' research in the field of flour bleaching led them to believe that there was inefficient utilization of a gaseous bleaching reagent when it was added to the flour, and a series of experiments were made to demonstrate this fact and to indicate a more efficient procedure. For example, laboratory tests according to the prior art might indicate on a given flour that four grams of nitrogen trichloride per barrel of flour were needed to obtain a suitable bleach. It is customary to express dosages of bleaching reagents in terms of grams or ounces per barrel of flour. As mentioned above, the gas is applied to the flour at a low partial pressure by mixing with air and blowing the mixture into the agitator. This treatment would give a certain measurable amount of bleaching action. However, we have found that if repeated doses of smaller quantities of the gaseous bleaching reagent were used, a smaller total quantity of bleaching agent is required for the same total bleaching action. For instance, in some cases three successive treatments of flour with one gram each of nitrogen trichloride per barrel of flour accomplished the same result that a single dose of four grams of nitrogen trichloride per barrel of flour would give in terms of color removal. At other times, two successive doses of approximately 1.5 grams each would give the same result. This is of considerable importance because the cost of total reagent used is materially decreased, but it may be even more important because of the possibility of achieving a very interesting and valuable additional result. It is possible to overtreat a flour with a bleaching reagent, both from the standpoint of color, baking properties, and keeping qualities. With the usual methods of applying bleaching agents, adequate color removal may be accomplished but with certain types of flours this result cannot be accomplished without sacrificing desirable baking properties and keeping qualities. Therefore, the application of repeated small dosages, which achieve adequate color removal with a lower total dosage of bleaching reagent and which may not have a deleterious effect on the baking properties may be a decidedly advantageous way of applying the bleaching reagent.

*Multiple bleaching with dissimilar gases*

This phase of applicants' invention will be prefaced by the following example of the procedure used.

Baker's patent flour is fed into an agitator (as shown in the drawing) at the rate of twenty barrels per hour. In the conventional equipment, the flour enters at one end of the agitator and is gradually moved to the other end as a result of the action of a series of agitating blades which keep the flour in constant motion and keep a part of it in suspension in the free space above the body of the flour. This flour after the bleaching treatment exits at the opposite end of the agitator. Nitrogen trichloride (in this example, a total of two grams per barrel), is introduced into the agitator at low partial pressure at the same end at which the flour enters. This partial pressure is adjusted to the optimum level for the efficient utilization of the chemical bleaching agent by varying the speed of the flour through the agitator or by varying the amount of air which is introduced into the agitator. In our experiments, the reaction between the gaseous bleaching agent and the flour in the first bleaching compartment is complete but the flour, from the first compartment, has not been bleached to the desired level, as this completion of the bleaching and maturing of the flour occurs in the second bleaching compartment of the agitator after the exposure of the flour, in a finely divided condition, to the action of the second bleaching gas. On leaving the first agitator the flour passes to the second bleaching compartment of the agitator through which it again travels in the manner described above. However, nitrogen peroxide is added to the second bleaching compartment of the agitator at the rate of approximately 1½ grams per barrel. In this operation, the gases are metered by commercially available equipment and the individual operations are carried out according to normal bleaching procedure.

The partial pressure of the nitrogen trichloride in this example, however, was about one millimeter of mercury and the partial pressure of nitrogen peroxide was approximately 2 mm. of Hg.

A similar bleaching run was made applying the same quantities of gas in the reverse order. The results of this series of experiments which are illustrative of our process are given in the following table:

*Bleaching action of different methods of application of gas*

| Bleaching treatment per barrel of flour | Carotene |
| --- | --- |
| | P. p. m. |
| Unbleached | 3.18 |
| 2 grams of $NCl_3$ | 1.65 |
| 1.5 grams $NO_2$ followed by 2 grams of $NCl_3$ | 1.56 |
| 2 grams $NCl_3$ followed by 1.5 grams $NO_2$ | 1.07 |

Comparison of the last two results illustrated above, shows that the order of application is important. The order listed in the last example, that is, nitrogen trichloride followed by nitrogen peroxide, is the preferred method for bleaching action, from the color removal standpoint.

Some reagents are more efficient in removing color (carotenoid pigments principally) than others. Nitrogen peroxide in this respect is regarded as a weak reagent and is not used according to present bleaching practice as the sole color removing agent, because adequate color removal is not achieved. Color removal experiments have demonstrated that not all color is removed with equal facility. Thus the initial bleaching action seems to take place most readily. After each increment of color removal, the residual color has been more difficult to remove with the same reagent. In other words, it requires relatively more reagent to achieve the last fraction of color removal than the first. On this basis, when two reagents like nitrogen trichloride and nitrogen peroxide are applied, the former being a much stronger color removing agent than the latter, it would seem that the weaker reagent nitrogen peroxide should be used first to remove the more easily bleached portion of color. In our experiments, the surprising result was that this was not true, and we have demonstrated that the reverse order is preferable, namely, nitrogen trichloride followed by nitrogen peroxide.

Similar experiments made with combinations of the common gases already listed show that in most cases there is a preferential order of application for the attainment of optimum bleaching action. The order of preference for the gases tested depending upon the desired result to be attained is shown in the following table, but since the mechanism of bleaching is not fully known, and since only a few reagents are available, no general pattern can be given but instead a preferred order for each pair of reagents has been indicated:

*Preferential order of application and bleaching action*

First gas:     Second gas:
$NCl_3$ + flour → $NO_2$ + same flour
$Cl_2$   + flour → $NCl_3$ + same flour
$Cl_2$   + flour → $ClO_2$ + same flour
$ClO_2$ + flour → $NCl_3$ + same flour
$HOCl$ + flour → $ClO_2$ + same flour The above table indicates the preferred order of application for maximum color removal and is frequently the order for optimum maturing action. However, the reverse of the order indicated above is sometimes preferable when optimum baking properties alone are considered. For example, with some flours it has been found that nitrogen peroxide followed by nitrogen trichloride resulted in optimum baking properties, but not maximum color removal.

Our researches did not indicate that there is any preference in order for hypochlorous acid versus chlorine or for hypochlorous acid versus nitrogen trichloride.

As applied to the bleaching reagents listed in this table, it is possible to place them in such an order that the best results are obtained when any one of the gases listed is followed by any one of the reagents listed below it. Such an order with the exceptions noted above is as follows:

$Cl_2$ ----------------------------- Chlorine
$HOCl$ ---------------------------- Hypochlorous acid
$ClO_2$ ---------------------------- Chlorine dioxide
$NCl_3$ ---------------------------- Nitrogen trichloride
$NO_2$ ----------------------------- Nitrogen peroxide The value of applicants' processes of multiple bleaching has been stated to a certain extent, but there are other valuable results which also appear. Normally, one gaseous reagent was used as far as it was considered safe without injuring baking properties and then "Novadel" (benzoyl peroxide) was added to the flour to give the rest of the bleach. The amount of benzoyl peroxide used was held to a minimum because of its high cost. If nitrogen trichloride is used in too great a quantity, the flour is injured, and one or more of the baking characteristics of the flour are not satisfactory. Therefore, the amount that can be used is limited and the cost for benzoyl peroxide increases.

Nitrogen peroxide is very inexpensive because it is easily generated by the electric arc. However, when it is added alone in amounts large enough to produce adequate color removal, there is a definite tendency for the flour to become rancid. For these reasons nitrogen peroxide is used commercially for only a part of the color removal and is followed usually by benzoyl peroxide to complete the desired color removal.

It has been found experimentally that little or nothing is gained by mixing nitrogen trichloride and nitrogen peroxide simultaneously in the same agitator. Thus, for example, two grams of nitrogen trichloride applied to a flour gave a resultant carotene value of 1.22 P. P. M. When two grams of nitrogen trichloride and 0.75 gram nitrogen peroxide were added simultaneously to the flour the carotene value was likewise 1.22 P. P. M. Thus, the addition of nitrogen peroxide was of no value and did not lead to more color removal.

It was discovered by experiment that some unexpected and valuable results are obtained by selecting a preferred order of treatment, namely, when nitrogen trichloride treatment is followed by nitrogen peroxide treatment. A greater color removal is achieved and improved baking properties result, as will be seen by the following example:

|  | Carotene | Loaf |
|---|---|---|
|  | *P. p. m.* | *Volume-cc.* |
| 2 grams nitrogen trichloride/bbl. and 1.5 grams $NO_2$ added simultaneously | 0.98 | 2,725 |
| 2 grams nitrogen trichloride/bbl. followed by 1.5 grams $NO_2$ | 0.78 | 2,855 |
| Unbleached flour | 2.20 | 2,825 |

Further, it has been found that considerable advantage accrues when a gaseous bleaching agent is added in small increments instead of as a single dosage. When the sum of the increments equal the quantity of reagent used in a single treatment substantially more color removal is accomplished by the former than the latter, and this may be the desired result. On the other hand, less and sometimes considerably less bleaching reagent may be added in small increments with the same bleaching effect the larger single treatment had, a result that is frequently advantageous. The advantage resides in the circumstance that bleaching sometimes injures the baking properties of the flour and hence the smaller the dosage of reagent required for adequate color removal the better, in fact, adequate color removal may be achieved without causing substantial damage to baking properties. In general, these results will be to bleach flour more cheaply and in many cases to improve baking qualities with benefit to the miller, the baker and the ultimate consumer.

*Multiple bleaching followed by blending*

In addition to the procedure outlined above, a stream of flour may be bleached by the successive action of two similar gases or by the successive action of two dissimilar gases and then this flour stream may be blended with another portion of flour which has been treated by the successive action of two bleaching agents to obtain desirable results. This makes it possible to obtain optimum balance between bleaching action and change in the baking properties. It is obvious that certain combinations of flour may be better for general use than either one of the flours alone, but in order to get an effect that is of commercial value, it is necessary to increase the benefits by considerable amounts. The results of such a test are given in the following table which shows the scoring of bread baked from flour prepared by various treatments of the same lot of patent flour:

| | Treatment per barrel of flour | Crumb color | Crumb grain | Volume of #1 loaf cc. | Carotene content of treated flour |
|---|---|---|---|---|---|
| 1 | Control test—2½ grams of nitrogen trichloride+0.032 oz. benzoyl peroxide. | 10 | 10 | 2,800 | 0.80 |
| 2 | 1.75 oz. chlorine, followed by 1.5 gms. NO₃. | 10, dull white. | 10 | 2,670 | 0.87 |
| 3 | 3 grams nitrogen trichloride, followed by 1.5 grams NO₃. | 10, dull creamy. | 10 | 2,655 | 0.78 |
| 4 | Blend 50%, #2, 50% #3. | 11 | 10+ | 2,795 | 0.83 |

From the above table it will be noted that the volume of the bread baked with the blend of #2 and #3 is just as good as that of bread baked with the control flour in spite of the fact that bread baked with either of the component parts of the blend showed a very marked decrease in the size of the loaf. In addition, the combination of these two flours yields a final loaf which has a measurably improved crumb color and grain. Such results could not have been predicted but evidently must be attributed to a complementary action of the treatments on the flour. It will be noted that the crumb color is graded in units. The crumb color of a selected standard loaf is taken as 10. The higher number indicates a better color; the rating of 11 is measurably better than 10. When applied to some other flours of varying grade, the results sometimes are even greater. In this example, the treatment consisted of dividing a given flour into two parts, treating each part with two different gases in succession and then combining the parts after treatment. Another method of utilizing this same principle is to treat two or more separate flours with a suitable succession of bleaching agents and then blend the treated flour; or to treat various groups of flour streams from the same wheat mix with the same or different types of treatments and then to combine these streams to form the finished products.

The particular treatment chosen for a flour depends not only on the type of wheat used but also upon the use to which the flour is to be put. For example, three simple classifications of flour are as follows: (1) Bread flour; (2) Cake flour; (3) All-purpose or family flour.

While the present invention has been described with particular reference to the treatment of wheat flour, it will be apparent that the invention is not limited thereto but may also be applied to various other streams of milled products such, for example, as rye.

By the term "bleaching" as used in the appended claims, it is intended to mean what the term means in commercial milling, namely color removal with or without accompanying improvement in the baking properties.

While the invention has been described in detail with specific examples, such examples are illustrative and are not given as limitations, since other modifications within the spirit and scope of the invention will be apparent to those skilled in the art.

We claim as our invention:

1. A process of bleaching flour products and other finely divided milled cereal products which comprises contacting said product, while agitated in a finely divided state, with a gaseous bleaching agent for a time sufficient to bleach said product partially, and then contacting the thus partly bleached product, while agitated in a finely divided state, with a further quantity of said gaseous bleaching agent for a time sufficient to bleach said product further.

2. A process of bleaching flour products and other finely divided milled cereal products which comprises contacting said product, while agitated in a finely divided state, with a gaseous bleaching agent included in the following list:

Chlorine
    Hypochlorous acid
    Chlorine dioxide
    Nitrogen trichloride for a time sufficient to bleach said product partially, and then contacting the thus partly treated product, while agitated in a finely divided state, with a gaseous bleaching agent included in the above list but appearing lower in the list than said first-mentioned gaseous agent, to bleach said product further.

3. A process of bleaching flour products and other finely divided milled cereal products which comprises contacting said product, while agitated in a finely divided state, with chlorine for a time sufficient to bleach said product partially, and then contacting the thus partly treated product with nitrogen trichloride to bleach said product further.

4. A process of bleaching flour products and other finely divided milled cereal products which comprises contacting said product, while agitated in a finely divided state, with a gaseous bleaching agent for a time sufficient to bleach said product partially, thereafter contacting the thus partly bleached product, while agitated in a finely divided state, with a gaseous bleaching agent for a time sufficient to bleach said product further, and blending said product with another finely divided milled cereal product treated in the same manner by a different combination of gaseous agents.

CHARLES G. FERRARI.
    WILLIS S. HUTCHINSON.